(12) United States Patent
Min et al.

(10) Patent No.: US 12,587,050 B2
(45) Date of Patent: Mar. 24, 2026

(54) FLUX CONCENTRATE TYPE ROTOR HAVING ARC TYPE PERMANENT MAGNETS

(71) Applicant: LG Electronics Inc., Seoul (KR)

(72) Inventors: Younggeun Min, Seoul (KR); Hongsik Hwang, Seoul (KR); Kyungmo Yu, Seoul (KR); Jaeho Kim, Seoul (KR); Kyungho Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 18/221,606

(22) Filed: Jul. 13, 2023

(65) Prior Publication Data

US 2024/0275224 A1 Aug. 15, 2024

(30) Foreign Application Priority Data

Feb. 13, 2023 (KR) ........................ 10-2023-0018558

(51) Int. Cl.
H02K 1/27 (2022.01)
H02K 1/276 (2022.01)
(52) U.S. Cl.
CPC ....... H02K 1/2773 (2013.01); H02K 2213/03 (2013.01)
(58) Field of Classification Search
CPC .... H02K 1/2773; H02K 2213/03; H02K 1/24; H02K 1/28; H02K 21/14
See application file for complete search history.

(56) References Cited

U.S. PATENT DOCUMENTS

| | | | |
|---|---|---|---|
| 11,128,185 B2 | 9/2021 | Zhang et al. | |
| 2015/0001970 A1 | 1/2015 | Zhang et al. | |
| 2017/0187256 A1* | 6/2017 | Zhang | H02K 1/2766 |
| 2023/0120874 A1* | 4/2023 | Kim | H02K 1/2773 |
| | | | 310/156.56 |

FOREIGN PATENT DOCUMENTS

| | | |
|---|---|---|
| CN | 106357025 | 1/2017 |
| CN | 107394927 A | 11/2017 |

(Continued)

OTHER PUBLICATIONS

Office Action in Korean Appln. No. 10-2023-0018558, mailed on Jul. 26, 2024, 13 pages (with English translation).

(Continued)

*Primary Examiner* — Thomas Truong
(74) *Attorney, Agent, or Firm* — Fish & Richardson P.C.

(57) ABSTRACT

A flux concentrate type rotor includes a rotor core including an inner diameter portion core, a plurality of outer diameter portion cores, and a plurality of bridges connecting the plurality of outer diameter portion cores to the inner diameter portion core, and a plurality of arc type permanent magnets each inserted between two adjacent outer diameter portion cores. Each of the plurality of bridges includes a first straight portion extending in a radial direction of the rotor core, and a first angle $\theta 1$ between a first extension line connecting a center of the arc type permanent magnet and a center of the inner diameter portion core and a second extension line connecting a center of the first straight portion of the bridge and the center of the inner diameter portion core satisfies: $\theta 1 = 5.75° \pm 4°$.

18 Claims, 11 Drawing Sheets

<u>230</u>

D: Second curvature
C: First curvature
231
233
C1
A: Thickness of magnet
A1
235a
235b } 235
Center point of second curvature
E: Magnetization center point gap
Center point of first curvature
B: Width of magnet

(56)     References Cited

FOREIGN PATENT DOCUMENTS

| | | | |
|---|---|---|---|
| JP | 2014-230348 | A | 12/2014 |
| JP | 2015070721 | A * | 4/2015 |
| KR | 10-1926850 | B | 12/2018 |
| KR | 20230055120 | | 4/2023 |

OTHER PUBLICATIONS

Extended European Search Report in European Appln. No. 23189976.6, mailed on Jan. 31, 2024, 9 pages.
Office Action in Korean Appln. No. 10-2023-0018558, mailed on Mar. 24, 2025, 5 pages (with English translation).

* cited by examiner

230

D: Second curvature

C: First curvature

A: Thickness of magnet

Center point of second curvature

Center point of first curvature

E: Magnetization center point gap

B: Width of magnet

| Section | Case1 | Case2 | Case3 |
|---|---|---|---|
| Contour | | | |
| First angle | −0.25 | 2.75 | 5.75 |

| Section | Case4 | Case5 | Case6 |
|---|---|---|---|
| Contour | | | |
| First angle | 8.75 | 11.75 | 14.75 |

0.0065
0.0060
0.0054
0.0049
0.0043
0.0038
0.0033
0.0027
0.0022
0.0016
0.0011
0.0005
0.0000

Unit=mm y x

FLUX CONCENTRATE TYPE ROTOR HAVING ARC TYPE PERMANENT MAGNETS

CROSS-REFERENCE TO RELATED APPLICATION

This application claims priority to and the benefit of Korean Patent Application No. 10-2023-0018558, filed in the Korean Intellectual Property Office on Feb. 13, 2023.

TECHNICAL FIELD

The present disclosure relates to a flux concentrate type rotor having an arc type permanent magnet, more specifically, to a flux concentrate type rotor capable of securing structural stability by minimizing a deformation amount of a rotor core.

BACKGROUND

A motor can obtain rotational force from electrical energy, and include a stator and a rotor. The rotor is configured to interact electromagnetically with the stator, and is rotated by a force acting between a magnetic field and a current flowing through a coil.

The motor using a permanent magnet to generate a magnetic field is divided into a surface mounted motor and an interior permanent magnet motor based on the coupling structure of the permanent magnet installed in the rotor core.

In a permanent magnet surface-attached motor, a permanent magnets may be attached to the surface of the core of the rotor. Such a motor has relatively low noise and vibration and good rotational force. However, it may not be easy to control for the separation of the permanent magnet during high-speed rotation. It may also decrease mechanical rigidity, and may be disadvantageous in terms to the diversification of the operating range.

In addition, the permanent magnet embedded motor has a permanent magnet that is inserted and fixed into an embedded hole formed by vertically penetrating the core of the rotor, and has a characteristic that the reluctance torque is added by the structure of the salient pole, so the torque and output are increased compared to the permanent magnet surface-attached motor in addition to the magnetic torque.

On the other hand, a flux concentrate type rotor has been developed, which attempts to improve efficiency of the motor by further improving torque and output, compared to the permanent magnet embedded motor. The flux concentrate type rotor may also be referred to as a spoke type motor.

Since the flux concentrate type rotor may be advantageous in that high torque and high output can be generated because the flux concentration is structurally high, and the rotor can be miniaturized for the same output. It can also be applied to driving motors such as washing machines, air conditioners, and electric vehicles that require high torque and high output characteristics.

In general, the flux concentrate type rotor includes a square bar type permanent magnet radially disposed around a shaft, and a rotor core provided to support the square bar type permanent magnets and form a path of flux.

The rotor core may be configured to include yokes disposed between the respective permanent magnets, and a cylindrical base positioned between the shaft and the permanent magnets and connected to each of the yokes.

However, when the flux concentrate type rotor that includes the square bar type permanent magnet is provided in an open slot structure, the mechanical strength may be weak because the force that tends to scatter the square bar type magnet is concentrated on the fixing protrusions formed on both side edges of the outer end of the outer diameter portion core.

In the case of a flux concentrate type rotor having a bar type permanent magnet, there is a limit in increasing the pole arc of the magnet due to the shape of the permanent magnet.

Therefore, a flux concentrate type rotor having an arc type permanent magnet capable of increasing the pole arc compared to a bar type permanent magnet in the same rotor size has been developed.

Some related art as to a flux concentrate type rotor having an arc type permanent magnet fails to disclose the performance of each design factor of the arc type permanent magnet for maximizing the performance of the motor, and fails to disclose the shape design of the arc type permanent magnet.

Other related art as to a flux concentrate type rotor having an arc type permanent magnet discloses a configuration in which the outer diameter portion core of the rotor core has an incision, and a bridge connecting the outer diameter portion core and the inner diameter portion core is spaced apart from the lower end of the arc type permanent magnet.

In such related art, although the amount of leakage flux can be reduced due to an increase in magnetic resistance due to an increase in the leakage path, there may be disadvantages in terms of structural rigidity and deformation of the rotor core.

SUMMARY

The present disclosure provides a flux concentrate type rotor that forms a bridge connecting an outer diameter portion core and an inner diameter portion core of the rotor core in an optimal position according to a shape of an arc type permanent magnet.

The present disclosure provides a flux concentrate type rotor capable of securing structural stability by minimizing the amount of deformation of the rotor core.

The present disclosure provides a flux concentrate type rotor capable of improving noise and vibration characteristics.

The present disclosure provides an arc type permanent magnet capable of maximizing the performance of the flux concentrate type rotor.

The present disclosure provides an arc type permanent magnet capable of effectively increasing back electromotive force compared to magnet usage in the same rotor size.

The present disclosure provides an arc type permanent magnet capable of maximizing back electromotive force.

The present disclosure provides a flux concentrate type rotor that increases mechanical rigidity by effectively dispersing the force that tends to scatter the magnet while adopting an open slot structure.

A flux concentrate type rotor according to an implementation of the present disclosure may comprise a rotor core including an inner diameter portion core, a plurality of outer diameter portion cores, and a plurality of bridges connecting the plurality of outer diameter portion cores to the inner diameter portion core; and a plurality of arc type permanent magnets each inserted between two adjacent outer diameter portion cores.

Each of the plurality of bridges may include a first straight portion extending in a radial direction of the rotor core, and a first angle $\theta 1$ formed between a first extension line connecting a center of the arc type permanent magnet and a center of the inner diameter portion core and a second extension line connecting a center of the first straight portion of the bridge in a width direction and the center of the inner diameter portion core may satisfy Equation (1) below:

$$\theta1 = 575° \pm 4°\qquad(1)$$

The center of the arc type permanent magnet may change according to the shape of the arc type permanent magnet, and the shape of the arc type permanent magnet may change depending on the size of the first curvature of the inner diameter portion, the size of the second curvature of the outer diameter portion, and the thickness of the arc type permanent magnet.

In addition, the first extension line may change according to the change of the center of the arc type permanent magnet.

Therefore, when the bridge is formed at a position where the angle between the first extension line and the second extension line satisfies Equation (1), the bridge can be formed at an optimal position according to the shape of the arc type permanent magnet.

The rotor core may include a plurality of core sheets. In the rotor core formed by stacking the plurality of core sheets, if the amount of deformation in the radial direction increases, friction between the core sheets may occur, resulting in deterioration in noise characteristics and vibration characteristics.

By the way, according to the flux concentrate type rotor of the present disclosure, since the bridge is positioned at the optimal position according to the shape of the arc type permanent magnet, it is possible to reduce the amount of deformation of the rotor core in the radial direction.

Therefore, it is possible to improve the structural stability of the rotor core, and maintain good noise characteristics and good vibration characteristics.

According to an implementation of the present disclosure, each of the plurality of arc type permanent magnets may include a concave inner diameter portion formed with a first curvature and a convex outer diameter portion formed with a second curvature, and the convex outer diameter portion may be disposed counterclockwise so as to be positioned in a counterclockwise direction.

In this case, the first extension line may connect the center of the arc type permanent magnet disposed adjacent to the bridge in a clockwise direction and the center of the inner diameter portion core.

According to another implementation of the present disclosure, each of the plurality of arc type permanent magnets may be disposed in a clockwise direction such that the convex outer diameter portion is positioned in the clockwise direction.

In this case, the first extension line may connect the center of the arc type permanent magnet disposed adjacent to the bridge in a counterclockwise direction and the center of the inner diameter portion core.

The arc type permanent magnet may further include a connecting portion connecting an end portion of the inner diameter portion to an end portion of the outer diameter portion, and the connecting portion may include a second straight portion connected to the end portion of the outer diameter portion and a third straight portion connecting an end portion of the second straight portion and the end portion of the inner diameter portion.

The arc type permanent magnet may satisfy at least one of Equations (2) to (6) below:

4

$$A = k1 \times C(k1 \text{ is } 0.31 \text{ to } 0.37);\qquad(2)$$
$$B = k2 \times A(k2 \text{ is } 2.9 \text{ to } 3.75);\qquad(3)$$
$$B = k3 \times E(k3 \text{ is } 1.8 \text{ to } 2.7);\qquad(4)$$
$$D = k4 \times C(k4 \text{ is } 0.62 \text{ to } 0.98);\qquad(5)$$
and
$$M = (C/D) \times A/(C-D)(M \text{ is greater than or equal to } 2.5).\qquad(6)$$

In the Equations (2) to (6), A is a thickness of the arc type permanent magnet, B is a width of the arc type permanent magnet, C is the first curvature of the inner diameter portion, D is the second curvature of the outer diameter portion, and E is a magnetization center point gap.

According to this configuration, it is possible to effectively increase the back electromotive force compared to magnet usage in the same rotor size, and since back electromotive force can be maximized, the performance of the flux concentrate type rotor can be maximized.

According to the present disclosure, the bridge can be formed at an optimal position capable of reducing the amount of deformation in the radial direction of the rotor core, which changes according to the shape of the arc type permanent magnet.

Accordingly, it is possible to improve the structural stability of the rotor core, and improve noise characteristics and vibration characteristics.

In addition, by designing the arc type permanent magnet using five variables (magnet thickness, magnet width, first curvature of the inner diameter portion, second curvature of the outer diameter portion, and magnetization center point gap), it is possible to manufacture the arc type permanent magnet having a high back electromotive force compared to the magnet usage and the flux concentrate type rotor having the same.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included as a part of the detailed description to help the understanding of the present disclosure, provide implementations of the present disclosure, and together with the detailed description, describe the technical features of the present disclosure.

FIG. 14 is a view showing a contour image according to a bridge position of a rotor core shown in FIG. 13.

DETAILED DESCRIPTION

Figure 1:
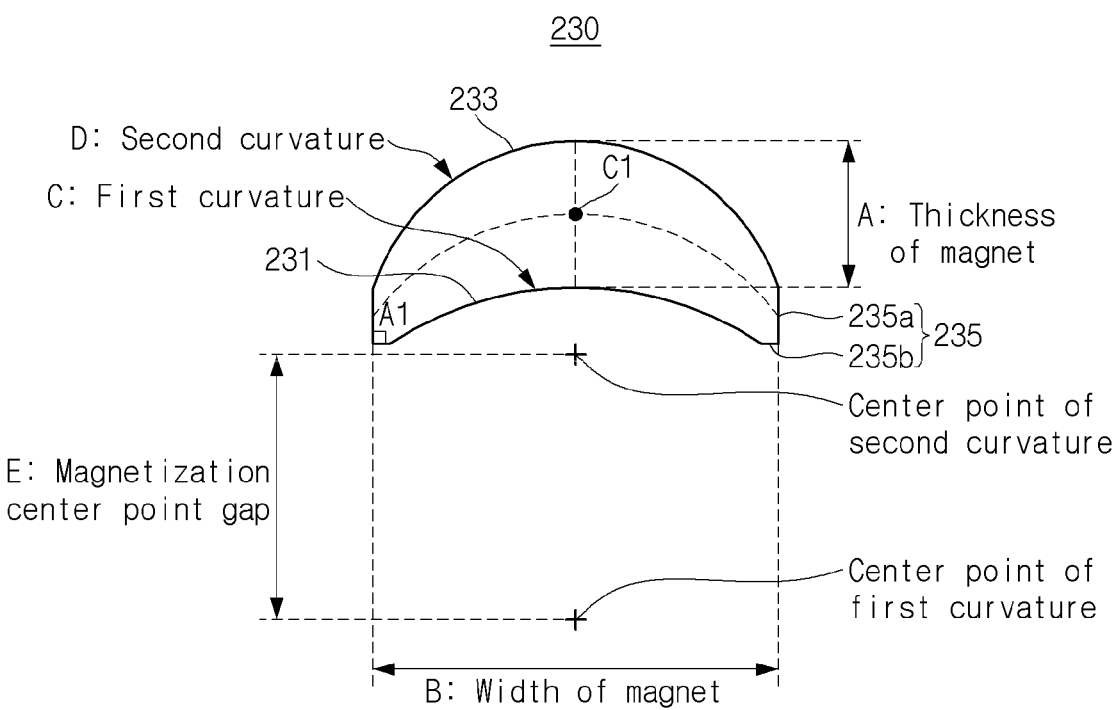
FIG. 1 is a cross-sectional view showing an arc type permanent magnet with maximized magnet usage.

Hereinafter, implementations disclosed in the present disclosure will be described in detail with reference to the accompanying drawings, however, regardless of the reference numerals, the same or similar elements will be given the same reference numerals and redundant description thereof will be omitted.

In addition, the accompanying drawings are only for easily understanding the implementations disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

While terms, such as "first", "second", etc., may be used to describe various elements, such elements must not be limited by the above terms. The above terms are used only to distinguish one element from another.

When an element is referred to as being "coupled" or "connected" to another element, it may be directly coupled to or connected to the other element, however, it should be understood that other elements may exist in the middle.

On the other hand, when an element is referred to as being "directly coupled" or "directly connected" to another element, it should be understood that there are no other elements in the middle.

The singular forms are intended to include the plural forms as well, unless the context clearly indicates otherwise.

In addition, in the present disclosure, it should be understood that the terms "comprise" and "have" specify the presence of stated features, integers, steps, operations, elements, parts, or combinations thereof, but do not preclude the presence or addition of one or more other features, integers, steps, operations, elements, parts, or combinations thereof.

FIG. 1 is a cross-sectional view showing an arc type permanent magnet with maximized magnet usage. FIGS. 2 to 6 are diagrams illustrating arc type permanent magnets according to implementations when at least two of five design elements are changed.

First, referring to FIG. 1, an arc type permanent magnet 230 is an arc type permanent magnet having an inner diameter portion 231 formed with a first curvature C and an outer diameter portion 233 formed with a second curvature D.

In this implementation, the second curvature D of the outer diameter portion 233 and the first curvature C of the inner diameter portion 231 are different from each other.

That is, the second curvature D of the outer diameter portion 233 may be greater than the first curvature C of the inner diameter portion 231, and the first curvature C of the inner diameter portion 231 may be greater than the second curvature of the outer diameter portion 233.

However, the second curvature D of the outer diameter portion 233 and the first curvature C of the inner diameter portion 231 may be the same.

The arc type permanent magnet 230 may further include a connecting portion 235 connecting an end portion of the inner diameter portion 231 and an end portion of the outer diameter portion 233, and the connecting portion 235 may include a first straight portion 235a connected to the end portion of the outer diameter portion 233 and a second straight portion 235b connecting the end portion of the first straight portion 235a and the end portion of the inner diameter portion 231.

The first straight portion 235a and the second straight portion 235b may have an interior angle A1 of 90 degrees.

FIG. 1 shows the arc type permanent magnet 230 in which the first curvature C of the inner diameter portion 231 is R12.5, the second curvature D of the outer diameter portion 233 is R8.0, and a magnetization center point gap E is 10.0.

Here, the magnetization center point gap E means a distance between the center point of the first curvature C and the center point of the second curvature D.

The arc type permanent magnet 230 shown in FIG. 1 has a thickness A of 5.5 and a width B of 15.1.

In FIG. 1, reference numeral C1 is the center of the arc type permanent magnet 230, and refers to the center in the width direction and the center in the thickness direction of the arc type permanent magnet 230.

Figure 2:
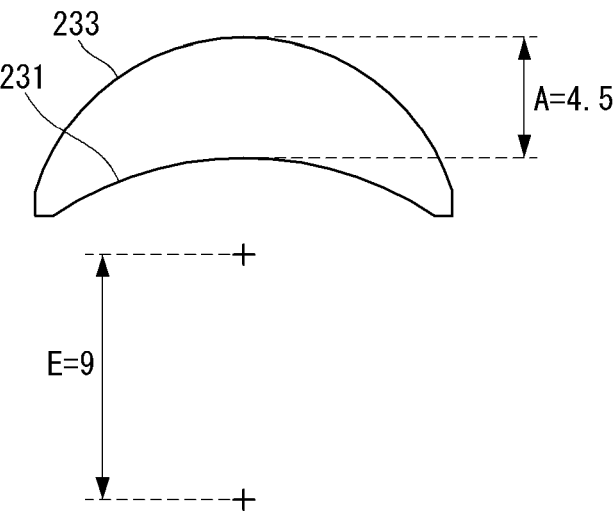
FIG. 2 is a view showing an arc type permanent magnet in which a thickness and a magnetization center point gap of the arc type permanent magnet shown in FIG. 1 are changed.

FIG. 2 is a view showing an arc type permanent magnet in which a thickness and a magnetization center point gap of the arc type permanent magnet shown in FIG. 1 are changed.

In the arc type permanent magnet of the present implementation, the design factors other than the thickness A and the magnetization center point gap E, that is, the width B, the first curvature C of the inner diameter portion, and the second curvature D of the outer diameter portion, have the same values as those of the arc type permanent magnet of FIG. 1.

The thickness A of the arc type permanent magnet shown in FIG. 2 is 4.5, and the magnetization center point gap E is 9.

Figure 3:
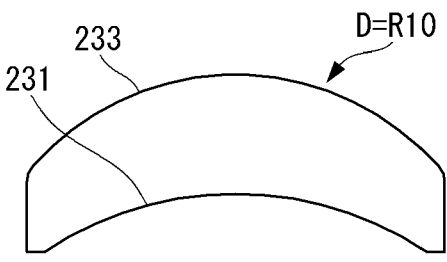
FIG. 3 is a view showing an arc type permanent magnet in which a second curvature of an outer diameter portion and a magnetization center point gap of the arc type permanent magnet shown in FIG. 1 are changed.
Figure 3:
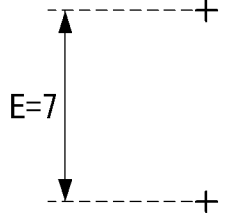

FIG. 3 is a view showing an arc type permanent magnet in which a second curvature of an outer diameter portion and a magnetization center point gap of the arc type permanent magnet shown in FIG. 1 are changed.

In the arc type permanent magnet of the present implementation, the remaining design factors other than the second curvature D of the outer diameter portion and the magnetization center point gap E, that is, the width B and the first curvature C of the inner diameter portion and the thickness A have the same values as those of the arc type permanent magnet of FIG. 1.

The second curvature D of the outer diameter portion of the arc type permanent magnet shown in FIG. 3 is R10.0, and the magnetization center point gap is 7.

Figure 4:
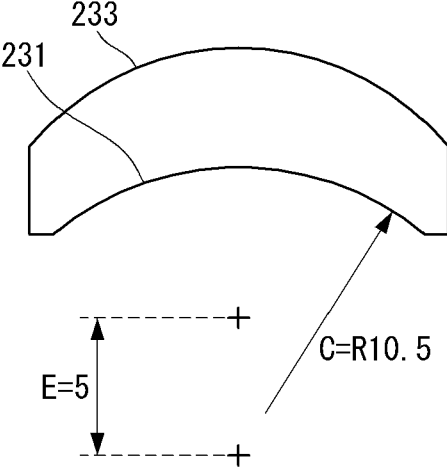
FIG. 4 is a view showing an arc type permanent magnet in which a first curvature of an inner diameter portion and a magnetization central point gap of the arc type permanent magnet shown in FIG. 1 are changed.

FIG. 4 is a view showing an arc type permanent magnet in which a first curvature of an inner diameter portion and a magnetization central point gap of the arc type permanent magnet shown in FIG. 1 are changed.

In the arc type permanent magnet of the present implementation, the design factors other than the first curvature C of the inner diameter portion and the magnetization center point gap E, that is, the thickness A and the width B, and the second curvature D of the outer diameter portion, have the same values as those of the arc type permanent magnet of FIG. 1.

The first curvature C of the inner diameter portion of the arc type permanent magnet shown in FIG. 4 is R10.5, and the magnetization center point gap E is 5.

Figure 5:
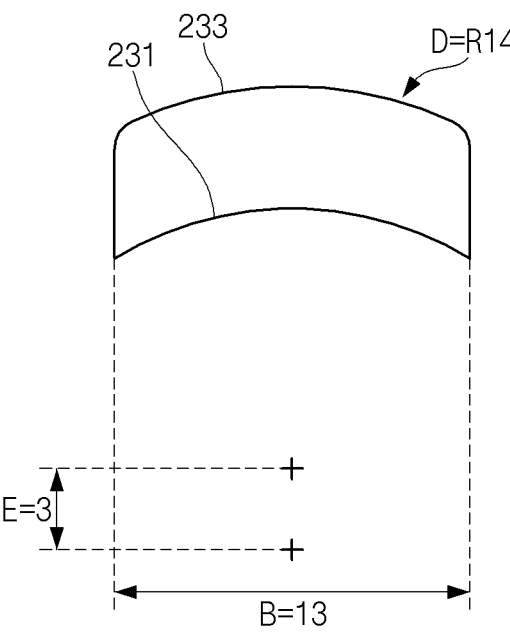
FIG. 5 is a view showing an arc type permanent magnet in which a width, a second curvature of an outer diameter portion, and a magnetization center point gap of the arc type permanent magnet shown in FIG. 1 are changed.

FIG. 5 is a view showing an arc type permanent magnet in which a width, a second curvature of an outer diameter portion, and a magnetization center point gap of the arc type permanent magnet shown in FIG. 1 are changed.

In the arc type permanent magnet of the present implementation, the remaining design factors other than the width B, the second curvature D of the outer diameter portion and the magnetization center point gap E, that is, the thickness A and the first curvature C of the inner diameter portion have the same values as those of the arc type permanent magnet of FIG. 1.

The width B of the arc type permanent magnet shown in FIG. 5 is 13, the second curvature D of the outer diameter portion is R14.0, and the magnetization center point gap E is 3.

Figure 6:
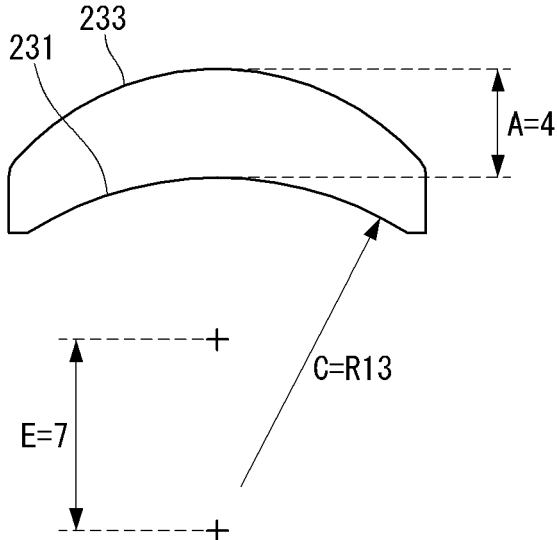
FIG. 6 is a view showing an arc type permanent magnet in which a thickness and a first curvature of an inner diameter portion of an arc type permanent magnet shown in FIG. 1 are changed.

FIG. 6 is a view showing an arc type permanent magnet in which a thickness and a first curvature of an inner diameter portion of an arc type permanent magnet shown in FIG. 1 are changed.

In the arc type permanent magnet of the present implementation, the design factors other than the thickness A and the first curvature C of the inner diameter portion, that is, the width B, and the second curvature D of the outer diameter portion, and the magnetization center point gap E have the same values as those of the arc type permanent magnet of FIG. 1.

The thickness A of the arc type permanent magnet shown in FIG. 6 is 4, the first curvature C of the inner diameter portion is R13, and the magnetization center point gap E is 7.

Table 1 below describes the magnet usage, back electromotive force (Bemf), and a ratio of back electromotive force to the magnet usage of each of the arc type permanent magnets shown in FIGS. 1 to 6.

TABLE 1

|  | FIG. 1 | FIG. 2 | FIG. 3 | FIG. 4 | FIG. 5 | FIG. 6 |
|---|---|---|---|---|---|---|
| Magnet Usage | 128% | 100% | 109% | 114% | 102% | 96% |
| Back Electromotive Force | 55.8 | 50.9 | 56.1 | 57.1 | 51.7 | 52.8 |
| Back Electromotive Force/Magnet Usage | 0.436 | 0.502 | 0.503 | 0.494 | 0.500 | 0.543 |

Referring to Table 1, it is possible to optimize performance required for a corresponding motor while appropriately changing five design factors, that is, the thickness A, the width B, the first curvature C of the inner diameter portion, the second curvature D of the outer diameter portion, and the magnetization center point gap E.

For example, in the case of air conditioner motors where magnet overhangs are essential to maintain sensor spacing, the arc type permanent magnet shown in FIG. 4 can be used.

Also, the arc type permanent magnet shown in FIG. 6 can be used as an arc type permanent magnet having a large increase in back electromotive force compared to the magnet usage (e.g., a ratio of back electromotive force to the magnet usage).

For the permanent magnet of the square bar type, the width and thickness of the permanent magnet are used as design factors.

However, it may be difficult to diversify the shape design of the permanent magnet with the above two design factors, and when the outer diameter of the shaft is determined according to the applied product group, the range may be further limited.

In addition, in the case of the square bar type permanent magnet, the thickness of the permanent magnet is highly correlated with the demagnetization of the motor, and the length of the permanent magnet contributes more to improving the back electromotive force of the motor.

However, in the flux concentrate type motor, as the length of the permanent magnet is longer, there is also a problem of poor magnetization of the permanent magnet because the lower end of the permanent magnet is located deeper toward the inner diameter portion core.

However, in the case of the arc type permanent magnet of the present disclosure, when it has the same magnet volume as the square bar type, it is possible to design a short length of the permanent magnet (width of the permanent magnet), and it is possible to design the thickness of both ends of the permanent magnet to be thin, so that it is advantageous compared to the bar type permanent magnets in terms of magnetization.

In addition, according to the present disclosure, it is possible to analyze the effect of increasing the back electromotive force of the motor according to the five design factors (e.g., thickness, width, first curvature of inner diameter portion, second curvature of outer diameter portion, and magnetization center point gap) defined in the present disclosure, and it is possible to maximize the effect of the motor by specifying the ratio for each factor.

Hereinafter, the synergistic effect of the back electromotive force compared to the magnet usage according to the ratio of each factor will be described with reference to FIGS. 7 to 10.

Figure 7:
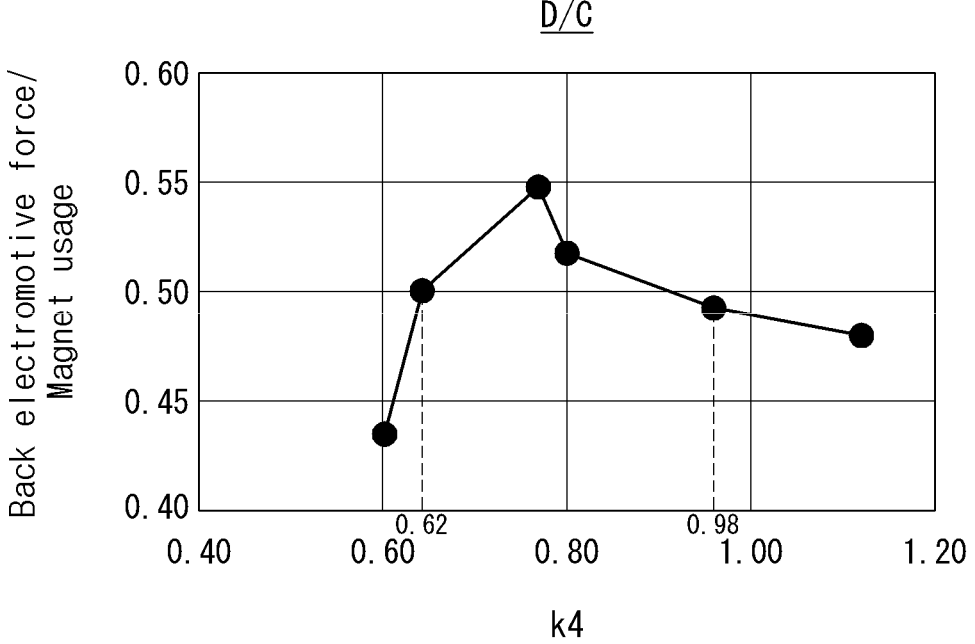
FIG. 7 is a graph showing a magnitude of back electromotive force compared to magnet usage according to a ratio of a first curvature of an inner diameter portion to a second curvature of an outer diameter portion of the arc type permanent magnet.
Figure 8:
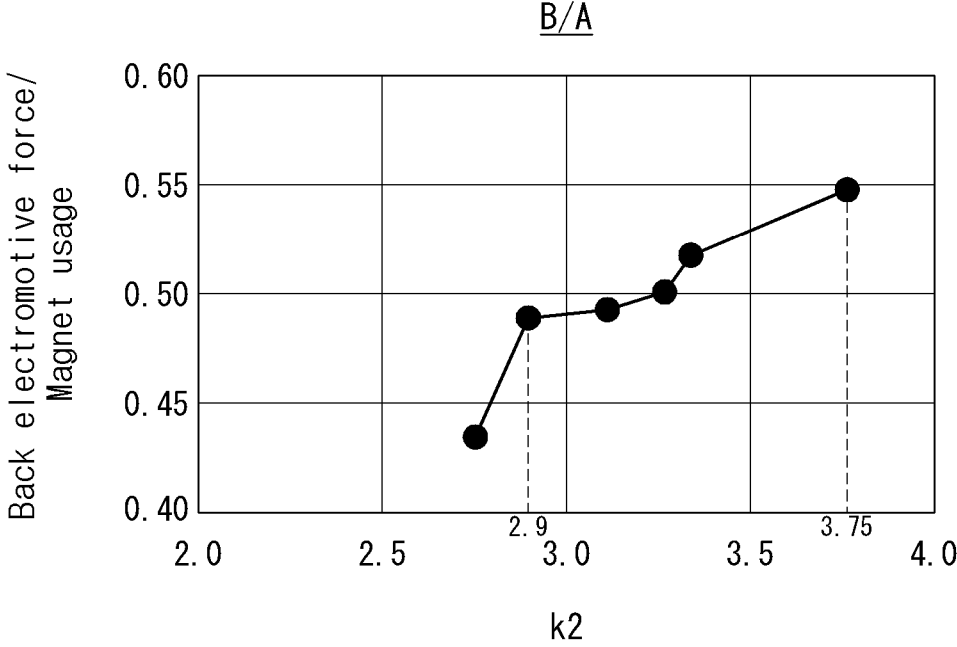
FIG. 8 is a graph showing a magnitude of back electromotive force compared to magnet usage according to a ratio of a thickness to width of the arc type permanent magnet.

FIG. 7 is a graph showing a magnitude of back electromotive force compared to magnet usage according to a ratio of a first curvature of an inner diameter portion to a second curvature of an outer diameter portion of the arc type permanent magnet, and FIG. 8 is a graph showing a magnitude of back electromotive force compared to magnet usage according to a ratio of a thickness to width of the arc type permanent magnet.

Figure 9:
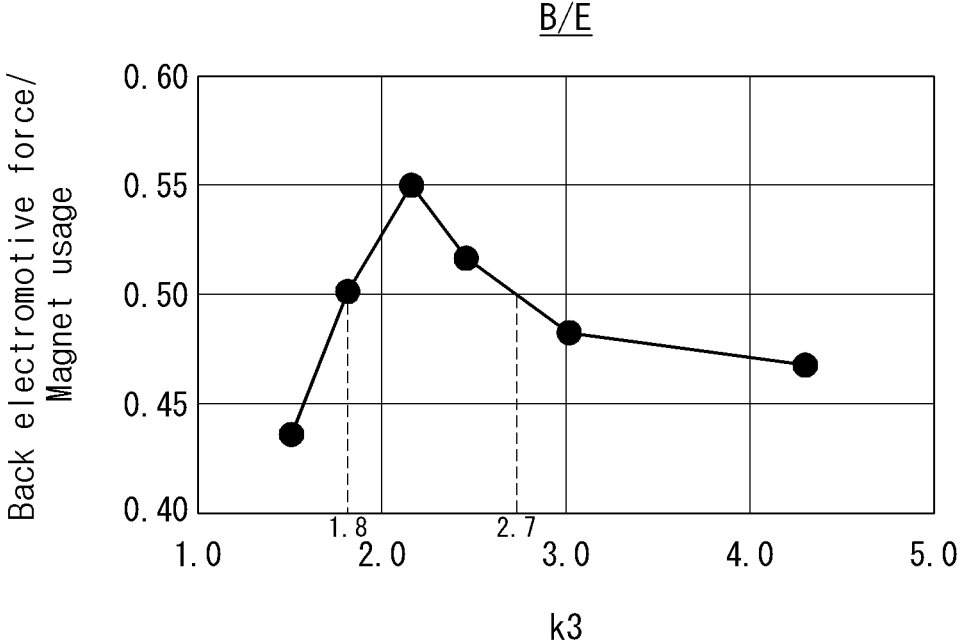
FIG. 9 is a graph showing a magnitude of back electromotive force compared to magnet usage according to a ratio of a magnetization center point gap to a width of the arc type permanent magnet.
Figure 10:
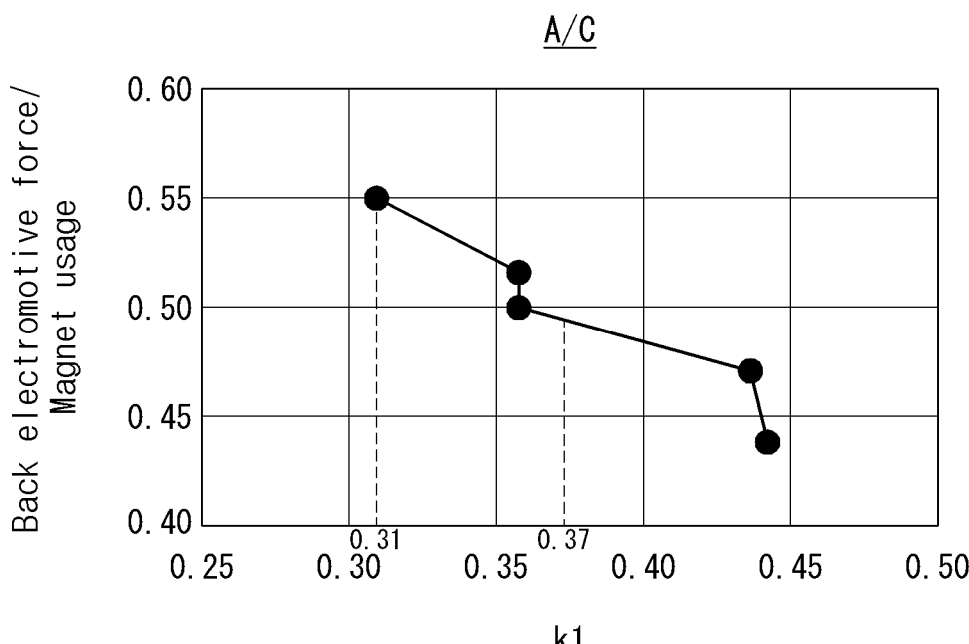
FIG. 10 is a graph showing a magnitude of back electromotive force compared to magnet usage according to a ratio of a first curvature of an inner diameter portion to a thickness of the arc type permanent magnet.

FIG. 9 is a graph showing a magnitude of back electromotive force compared to magnet usage according to a ratio of a magnetization center point gap to a width of the arc type permanent magnet, and FIG. 10 is a graph showing a magnitude of back electromotive force compared to magnet usage according to a ratio of a first curvature of an inner diameter portion to a thickness of the arc type permanent magnet.

Referring to FIGS. 7 to 10, the arc type permanent magnet may be designed to satisfy at least one of Equations (2) to (5) below:

$$A = k1 \times C(k1 \text{ is } 0.31 \text{ to } 0.37); \tag{2}$$

$$B = k2 \times A(k2 \text{ is } 2.9 \text{ to } 3.75); \tag{3}$$

$$B = k3 \times E(k3 \text{ is } 1.8 \text{ to } 2.7); \text{ and} \tag{4}$$

$$D = k4 \times C(k4 \text{ is } 0.62 \text{ to } 0.98). \tag{5}$$

In the above Equations (2) to (5), A is the thickness of the arc type permanent magnet, B is the width of the arc type permanent magnet, C is the first curvature of the inner diameter portion, D is the second curvature of the outer diameter portion, E is the magnetization center point gap.

In Equations (2) to (5), units of the thickness A, width B, and magnetization center point gap E of the arc type permanent magnet may be the same.

For example, units of the thickness A, width B, and magnetization center point gap E of the arc type permanent magnet may be mm or cm.

In the above Equations (2) to (5), when k1 to k4 satisfy the above values, respectively, the back electromotive force compared to the magnet usage (a ratio of back electromotive force/magnet usage) of the arc type permanent magnet is approximately 0.5 or more.

On the other hand, in the case of designing a motor having only excellent back electromotive force than excellent performance of the back electromotive force compared to the magnet usage, the following Equation (6) may be referred to:

$$M = (C/D) \times A/(C - D)(M \text{ is greater than or equal to } 2.5). \tag{6}$$

Figure 11:
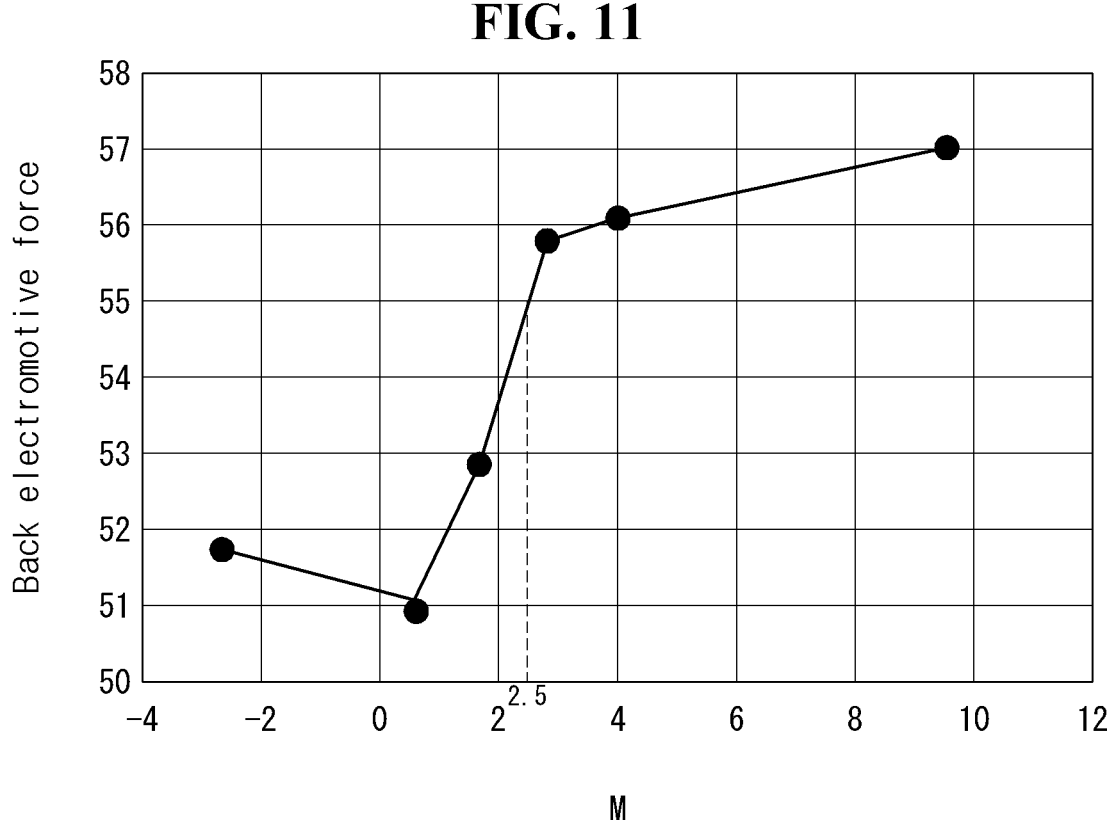
FIG. 11 is a graph showing a magnitude of back electromotive force according to a first curvature of an inner diameter portion, a second curvature of an outer diameter portion, and a thickness of the arc type permanent magnet.

Referring to FIG. 11, it can be seen that the back electromotive force rapidly rises when the design variable "M" exceeds 2, and then the slope becomes less steep.

Therefore, when designing an arc type permanent magnet with maximized back electromotive force, the design variable "M" can be set to 2.5 or more.

As described above, it is possible to design an arc type permanent magnet to satisfy at least one of the above Equations (2) to (6) according to required performance or conditions of the motor.

Hereinafter, a flux concentrate type rotor according to the present disclosure will be described.

Figure 12:
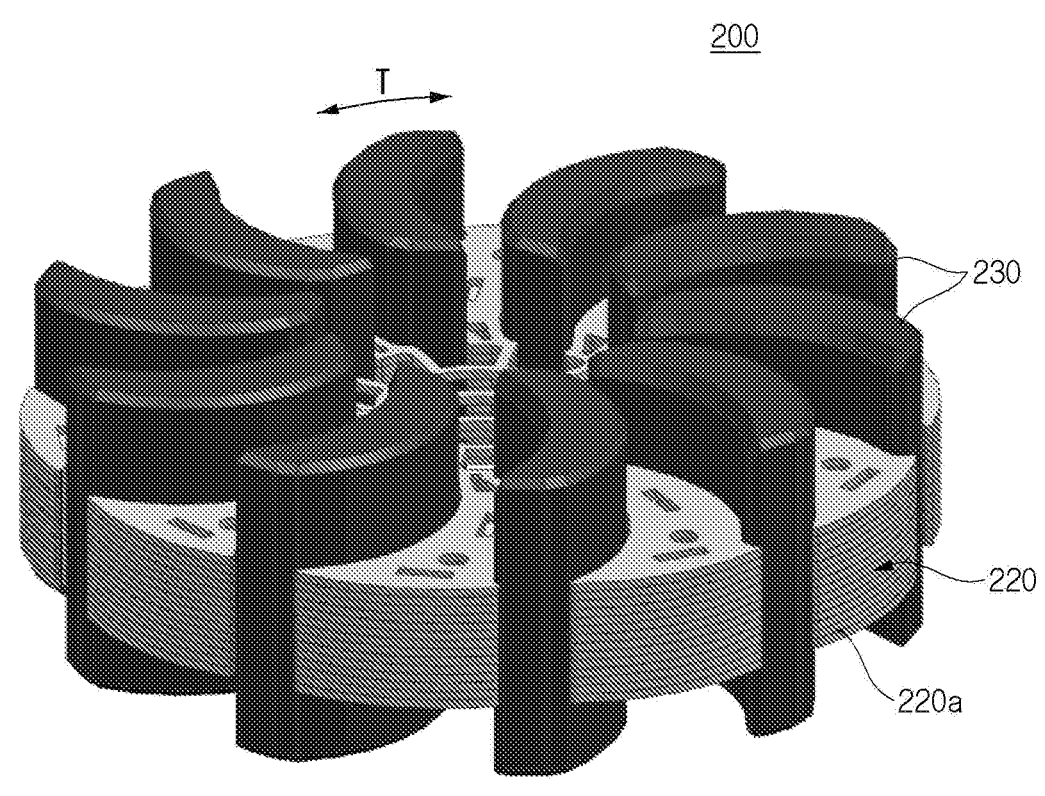
FIG. 12 is a perspective view showing a schematic configuration of a flux concentrate type rotor according to the present disclosure.
Figure 13:
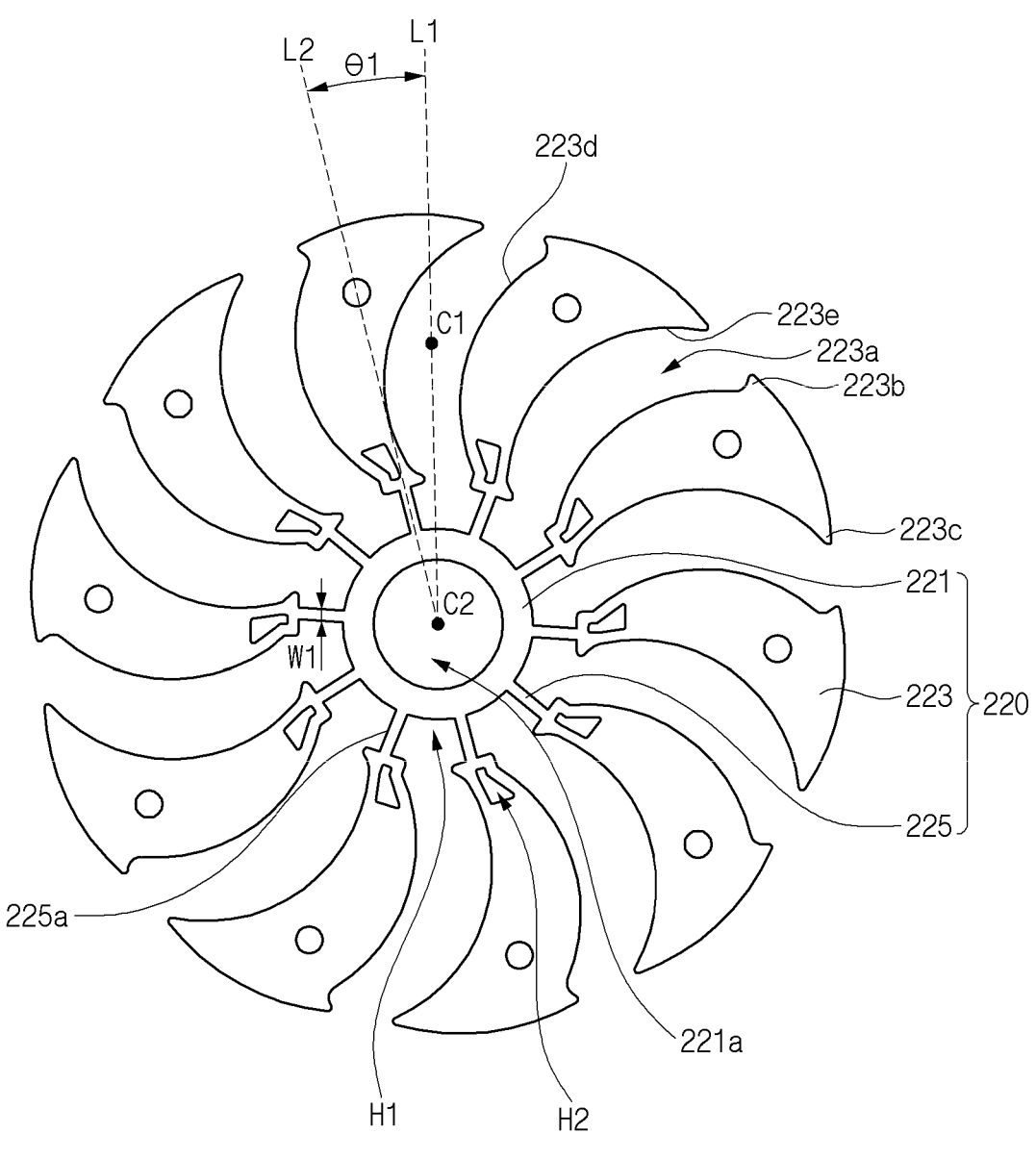
FIG. 13 is a diagram showing a schematic configuration of a rotor core shown in FIG. 12.

FIG. 12 is a diagram showing a schematic configuration of a flux concentrate type rotor according to the present disclosure, and FIG. 13 is a diagram showing a schematic configuration of a rotor core shown in FIG. 12.

In this implementation, a flux concentrate type rotor in which a plurality of arc type permanent magnets 230 are disposed in a counterclockwise direction will be described.

Here, that the arc type permanent magnets 230 are disposed counterclockwise means that the convex outer diameter portion 233 of the arc type permanent magnet 230 is disposed so as to be positioned in a counterclockwise direction.

The flux concentrate type motor includes a flux concentrate type rotor 200 and a stator surrounding the flux concentrate type rotor 200.

The stator may include a stator core and a plurality of teeth protruding in a radial direction from the stator core. The stator core may be formed in an annular shape.

Pole shoes extending in both circumferential directions may be provided at radially inner ends of the teeth. A slot may be formed between the teeth and the teeth, and a coil may be wound through the teeth and the slot.

The flux concentrate type rotor 200 includes a shaft, a rotor core 220, and the arc type permanent magnet 230.

The arc type permanent magnet 230 is an arc type permanent magnet including the inner diameter portion 231 formed with the first curvature C and the outer diameter portion 233 formed with the second curvature D.

The magnetization direction of each of the arc type permanent magnets 230 may proceed in a tangential direction T.

The arc type permanent magnet 230 may further include a connecting portion 235 connecting an end portion of the inner diameter portion 231 and an end portion of the outer diameter portion 233, and the connecting portion 235 may include a first straight portion 235a connected to the end portion of the outer diameter portion 233 and a second straight portion 235b connecting the end portion of the first straight portion 235a and the end portion of the inner diameter portion 231.

The first straight portion 235a and the second straight portion 235b may have an interior angle A1 of 90 degrees.

The rotor core 220 includes an inner diameter portion core 221, a plurality of outer diameter portion cores 223, and a plurality of bridges 225.

The rotor core 220 may be formed by stacking a plurality of core sheets 220a.

The inner diameter portion core 221 is formed in an annular ring shape having a shaft through hole 221a into which a shaft is inserted.

A plurality of outer diameter portion cores 223 are arranged along the circumferential direction (tangential direction) of the inner diameter portion core 221 on an outer circumferential surface of the inner diameter portion core 221, and spaced apart from each other to form permanent magnet insertion portions 223a for accommodating the arc type permanent magnets 230.

A first fixing protrusion 223b and a second fixing protrusion 223c protruding in an arc direction may be formed on both edge portions of the outer end of the outer diameter portion core 223. When the arc type permanent magnet 230 is inserted into the permanent magnet insertion portions 223a, the first and second fixing protrusions 223b and 223c serve to fix the position of the arc type permanent magnet 230, and when the rotor 200 rotates, the first and second fixing protrusions 223b and 223c serve to restrict the arc type permanent magnet 230 from scattering.

That is, the outer diameter portion core 223 has an open slot structure.

A plurality of bridges 225 are arranged along the circumferential direction of the inner diameter portion core 221 corresponding to each of the outer diameter portion core 223, and connects each of the outer diameter portion core 223 to the inner diameter portion core 221.

Each of the plurality of bridges 225 may include a first straight portion 225a extending in a radial direction of the rotor core 220, and the first straight portion 225a may have a first width W1.

The fact that the first straight portion 225a extends in the radial direction of the rotor core 220 means that a second extension line L2 connecting the center C2 of the inner diameter portion core 221 to the center of the first straight portion 225a in the width direction extends in the radial direction of the rotor core 220.

Also, it may mean that the first straight portion 225a is parallel to the second extension line L2.

In addition, it may mean that the widths of the first straight portions 225a positioned on both sides of the second extension line L2 are the same.

The outer diameter portion core 223 may be referred to as an outer core, and the inner diameter portion core 221 may be referred to as an inner core. This is because the inner diameter portion core 221 is positioned inside the outer diameter portion core 223 in the radial direction. Also, the outer diameter portion core 223 may be referred to as a yoke.

In the permanent magnet insertion portion 223a, the arc type permanent magnets 230 including an inner diameter portion 231 having a weak magnetic flux surface and an outer diameter portion 233 having a strong magnetic flux surface are disposed facing different sides from those adjacent to each other. Therefore, magnetic flux can be compensated and torque ripple can be reduced.

In a state where the arc type permanent magnet 230 is disposed, an air gap H1 partitioned by two adjacent bridges 225 in the circumferential direction of the inner diameter portion core 221 is formed at the lower end of the arc type permanent magnet 230, that is, between the first straight portion 235a and the inner diameter portion core 221 of the arc type permanent magnet 230.

The outer diameter portion core 223 may include a first side surface 223d in contact with the inner diameter portion 231 of the arc type permanent magnet 230 and a second side surface 223e in contact with the outer diameter portion 233 of the arc type permanent magnet 230.

The outer diameter portion core 223 may further include an air gap H2 at a position adjacent to the bridge 225.

In the flux concentrate type rotor 200 having this configuration, a first angle θ1 formed between a first extension line L1 connecting the center C1 of the arc type permanent magnet 230 and the center C2 of the inner diameter portion core 221 and a second extension line L2 connecting the center of the first straight portion 225a of the bridge 225 in the width direction and the center C2 of the inner diameter portion core 221 may satisfy Equation (1) below:

$$\theta 1 = 5.75° \pm 4°. \tag{1}$$

When the plurality of arc type permanent magnets 230 are disposed counterclockwise, respectively, the first extension line L1 may connect the center C1 of the arc type permanent magnet 230 disposed adjacent to the bridge 225 and the center C2 of the inner diameter portion core 221 in a clockwise direction.

That is, when the plurality of arc type permanent magnets 230 are disposed counterclockwise, respectively, the first extension line L1 may connect the center C1 of the arc type permanent magnet 230 contacting the second side surface 223e of the outer diameter portion core 223 and the center C2 of the inner diameter portion core 221.

Hereinafter, the basis for calculating Equation (1) will be described with reference to FIGS. 14 and 15.

Figure 15:
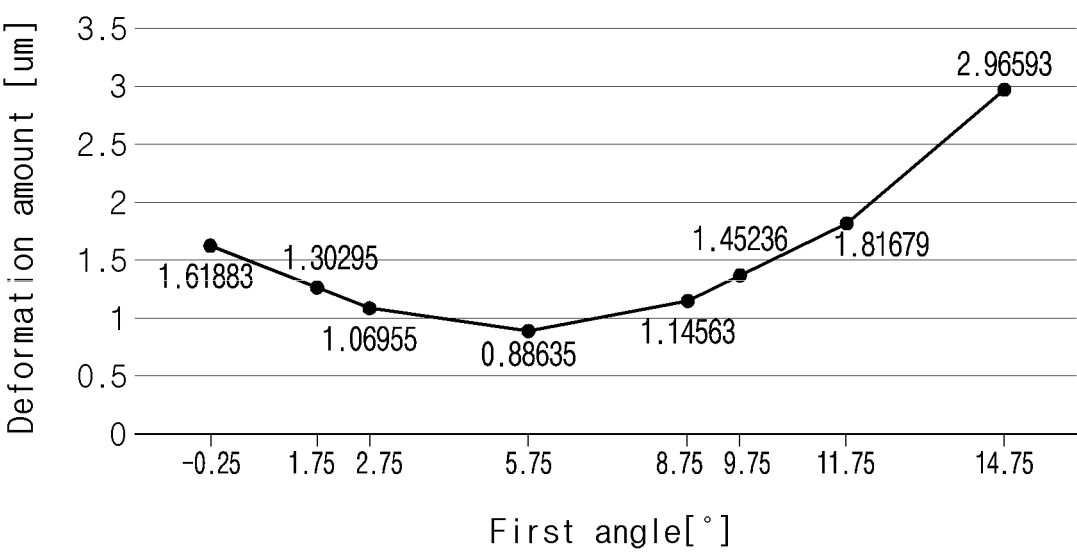
FIG. 15 is a view showing a deformation amount of a rotor core in a radial direction according to a bridge position of a rotor core shown in FIG. 13.

FIG. 14 is a view showing a contour image according to a bridge position of a rotor core shown in FIG. 13, and FIG. 15 is a view showing a deformation amount of a rotor core in a radial direction according to a bridge position of a rotor core shown in FIG. 13.

Referring to FIGS. 14 and 15, when the first angle θ1 is 5.75°, the amount of deformation in the radial direction of the rotor core is measured to be 0.88635 μm, and when the first angle θ1 is smaller than 5.75° and larger than 5.75°, it can be seen that the amount of deformation in the radial direction of the rotor core 220 increases, respectively.

In particular, when the first angle θ1 is −0.25°, it can be seen that the deformation toward the first side surface 223d of the outer diameter portion core 223 increases, and when the first angle θ1 is greater than or equal to 11.75°, it can be seen that the deformation toward the second side surface 223e of the outer diameter portion core 223 increases.

Accordingly, the first angle θ1 may be set from a range smaller than 5.75° by a predetermined angle to a range larger than 5.75° by a predetermined angle.

It is better as the amount of deformation in the radial direction of the rotor core 220 is smaller. However, when the amount of deformation of the rotor core 220 is managed within a certain range, for example, 1.5 μm, a problem caused by deformation of the rotor core 220 in the radial direction can be regarded as a negligible level.

Accordingly, referring to FIGS. 14 and 15, the first angle θ1 may be set from 1.75° to 9.75°.

Hereinafter, another implementation of the present disclosure will be described with reference to FIG. 16.

In FIGS. 12 to 15, a flux concentrate type rotor in which a plurality of arc type permanent magnets 230 are disposed in a counterclockwise direction has been described.

However, each of the plurality of arc type permanent magnets may be disposed in the clockwise direction.

Figure 16:
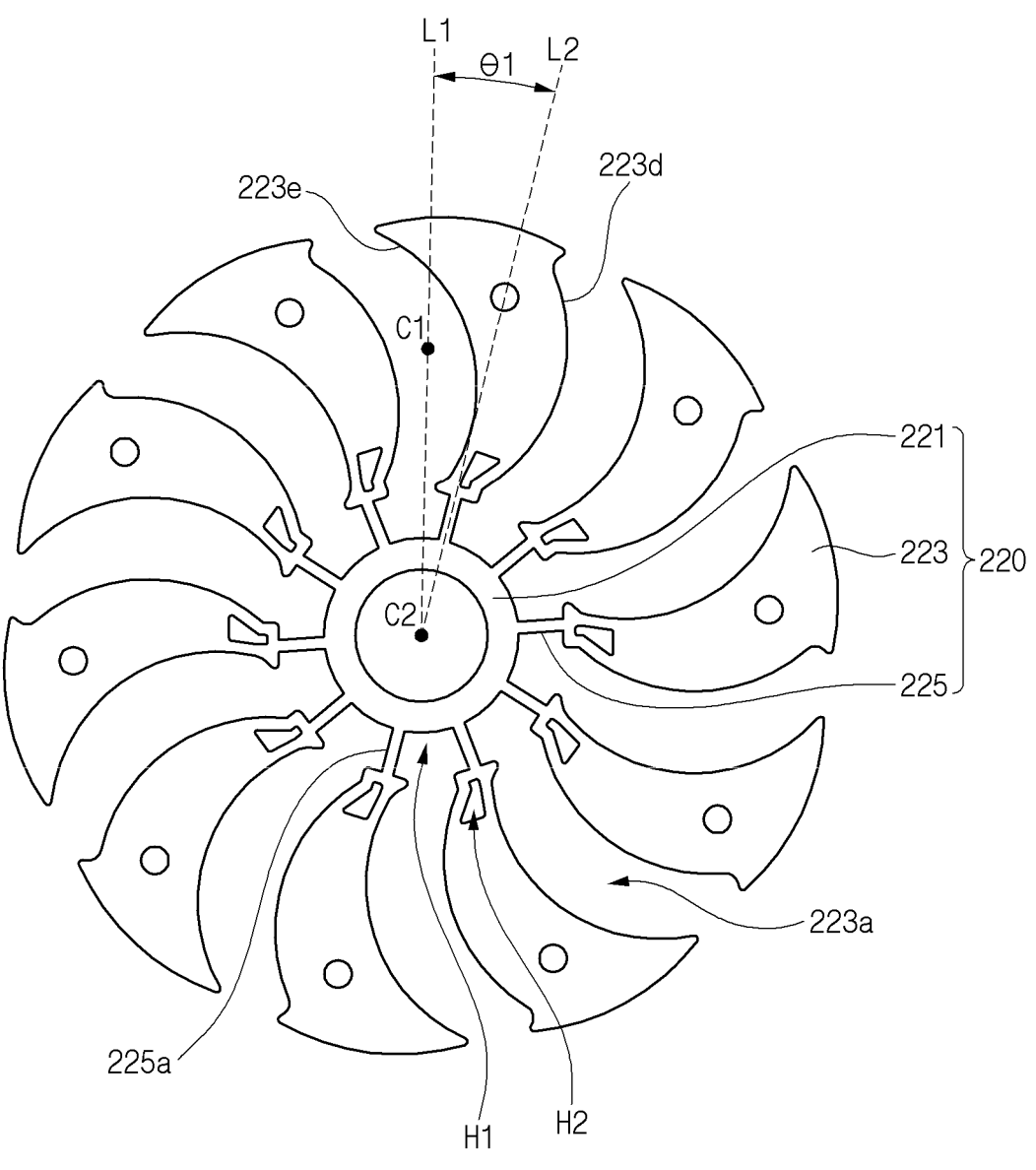
FIG. 16 is a diagram showing a schematic configuration of a rotor core according to another implementation of the present disclosure.

FIG. 16 is a diagram showing a schematic configuration of a rotor core according to another implementation of the present disclosure, and is a diagram showing a schematic configuration of a rotor core configured such that a plurality of arc type permanent magnets are disposed clockwise, respectively.

Here, that the arc type permanent magnet 230 is disposed clockwise means that the convex outer diameter portion 233 of the arc type permanent magnet 230 is positioned clockwise.

In other words, it can be seen that in the rotor core of this implementation, the concave inner diameter portion 231 of the arc type permanent magnet 230 is disposed counterclockwise.

In this case, the first extension line L1 may connect the center C1 of the arc type permanent magnet 230 disposed adjacent to the bridge 225 in the counterclockwise direction and the center C2 of the inner diameter portion core 221.

That is, when the plurality of arc type permanent magnets 230 are disposed counterclockwise, respectively, the first extension line L1 may connect the center C1 of the arc type permanent magnet 230 contacting the second side surface 223e of the outer diameter portion core 223 and the center C2 of the inner diameter portion core 221.

That is, when the plurality of arc type permanent magnets 230 are disposed clockwise, respectively, the first extension line L1 may connect the center C1 of the arc type permanent magnet 230 contacting the second side surface 223*e* of the outer diameter portion core 223 and the center C2 of the inner diameter portion core 221.

It is apparent to those skilled in the art that the present disclosure may be embodied in other specific forms without departing from the essential characteristics of the present disclosure. Accordingly, the above detailed description should not be construed as restrictive in all respects but should be considered as illustrative. The scope of the present disclosure should be determined by reasonable interpretation of the appended claims, and all changes within the equivalent scope of the present disclosure are included in the scope of the present disclosure.

What is claimed is:

1. A flux concentrate type rotor comprising:
a rotor core including an inner diameter portion core, a plurality of outer diameter portion cores, and a plurality of bridges connecting the plurality of outer diameter portion cores to the inner diameter portion core; and
a plurality of arc type permanent magnets, each of the plurality of arc type permanent magnets being inserted between two adjacent outer diameter portion cores of the plurality of outer diameter portion cores,
wherein each of the plurality of bridges includes a first straight portion extending in a radial direction of the rotor core,
wherein a first angle θ1 defined between a first extension line and a second extension line satisfies E(1):

$$\theta 1 = 5.75° \pm 4°, \tag{1}$$

wherein the first extension line connects a center of each of the plurality of arc type permanent magnets with a center of the inner diameter portion core, and
wherein the second extension line connects a center of the first straight portion in a width direction with the center of the inner diameter portion core,
wherein each of the plurality of arc type permanent magnets includes:
a concave inner diameter portion having a first curvature, and
a convex outer diameter portion having a second curvature, wherein the convex outer diameter portion is positioned in a counterclockwise direction or a clockwise direction,
wherein, based on the convex outer diameter portion being positioned in the counterclockwise direction, the first extension line connects (i) the center of a first arc type permanent magnet among the plurality of arc type permanent magnets, the first arc type permanent magnet being disposed adjacent to a corresponding bridge of the plurality of bridges in the clockwise direction, with (ii) the center of the inner diameter portion core,
wherein, based on the convex outer diameter portion being positioned in the clockwise direction, the first extension line connects (i) the center of a first arc type permanent magnet of the plurality of arc type permanent magnets that is disposed adjacent to a corresponding bridge of the plurality of bridges in the counterclockwise direction with (ii) the center of the inner diameter portion core, and wherein the first arc type permanent magnet satisfies Equation (2):

$$A = k1 \times C (k1 \text{ is } 0.31 \text{ to } 0.37), \tag{2}$$

where A is a thickness of the first arc type permanent magnet, and C is the first curvature of the concave inner diameter portion.

2. The flux concentrate type rotor of claim 1, wherein the rotor core includes a plurality of core sheets.

3. The flux concentrate type rotor of claim 1, wherein the first arc type permanent magnet further includes a connecting portion connecting an end portion of the concave inner diameter portion to an end portion of the convex outer diameter portion, and
wherein the connecting portion includes a second straight portion connected to the end portion of the convex outer diameter portion and a third straight portion, the third straight portion connecting an end portion of the second straight portion with the end portion of the concave inner diameter portion.

4. The flux concentrate type rotor of claim 3, wherein the first arc type permanent magnet satisfies E(4):

$$B = k3 \times E (k3 \text{ is } 1.8 \text{ to } 2.7), \tag{4}$$

where B is a width of the first arc type permanent magnet, and E is a magnetization center point gap.

5. The flux concentrate type rotor of claim 3, wherein the first arc type permanent magnet satisfies E(6):

$$M = (C/D) \times A/(C - D)(M \text{ is greater than or equal to } 2.5), \tag{6}$$

where A is the thickness of the first arc type permanent magnet, C is the first curvature of the concave inner diameter portion, and D is the second curvature of the convex outer diameter portion.

6. The flux concentrate type rotor of claim 1, wherein an outer diameter portion core includes a gap located adjacent to a bridge, and the gap and the first straight portion are arranged misaligned.

7. A flux concentrate type rotor comprising:
a rotor core including an inner diameter portion core, a plurality of outer diameter portion cores, and a plurality of bridges connecting the plurality of outer diameter portion cores to the inner diameter portion core; and
a plurality of arc type permanent magnets, each of the plurality of arc type permanent magnets being inserted between two adjacent outer diameter portion cores of the plurality of outer diameter portion cores,
wherein each of the plurality of bridges includes a first straight portion extending in a radial direction of the rotor core,
wherein a first angle θ1 defined between a first extension line and a second extension line satisfies Equation (1):

$$\theta 1 = 5.75° \pm 4°, \tag{1}$$

wherein the first extension line connects a center of each of the plurality of arc type permanent magnets with a center of the inner diameter portion core, and wherein the second extension line connects a center of the first straight portion in a width direction with the center of the inner diameter portion core, wherein each of the plurality of arc type permanent magnets includes:

a concave inner diameter portion having a first curvature, and a convex outer diameter portion having a second curvature, wherein the convex outer diameter portion is positioned in a counterclockwise direction or a clockwise direction, wherein, based on the convex outer diameter portion being positioned in the counterclockwise direction, the first extension line connects (i) the center of a first arc type permanent magnet among the plurality of arc type permanent magnets, the first arc type permanent magnet being disposed adjacent to a corresponding bridge of the plurality of bridges in the clockwise direction, with (ii) the center of the inner diameter portion core, wherein, based on the convex outer diameter portion being positioned in the clockwise direction, the first extension line connects (i) the center of a first arc type permanent magnet of the plurality of arc type permanent magnets that is disposed adjacent to a corresponding bridge of the plurality of bridges in the counterclockwise direction with (ii) the center of the inner diameter portion core, and wherein the first arc type permanent magnet satisfies E(3):

$$B = k2 \times A(k2 \text{ is } 2.9 \text{ to } 3.75), \tag{3}$$

where A is a thickness of the first arc type permanent magnet, and B is a width of the first arc type permanent magnet.

8. The flux concentrate type rotor of claim 7, wherein the rotor core includes a plurality of core sheets.

9. The flux concentrate type rotor of claim 7, wherein the first arc type permanent magnet further includes a connecting portion connecting an end portion of the concave inner diameter portion to an end portion of the convex outer diameter portion, and wherein the connecting portion includes a second straight portion connected to the end portion of the convex outer diameter portion and a third straight portion, the third straight portion connecting an end portion of the second straight portion with the end portion of the concave inner diameter portion.

10. The flux concentrate type rotor of claim 9, wherein the first arc type permanent magnet satisfies Equation (4):

$$B = k3 \times E(k3 \text{ is } 1.8 \text{ to } 2.7), \tag{4}$$

where B is a width of the first arc type permanent magnet, and E is a magnetization center point gap.

11. The flux concentrate type rotor of claim 9, wherein the first arc type permanent magnet satisfies Equation (6):

$$M = (C/D) \times A/(C - D)(M \text{ is greater than or equal to } 2.5) \tag{6}$$

where A is the thickness of the first arc type permanent magnet, C is the first curvature of the concave inner diameter portion, and D is the second curvature of the convex outer diameter portion.

12. The flux concentrate type rotor of claim 7, wherein an outer diameter portion core includes a gap located adjacent to a bridge, and the gap and the first straight portion are arranged misaligned.

13. A flux concentrate type rotor comprising:

a rotor core including an inner diameter portion core, a plurality of outer diameter portion cores, and a plurality of bridges connecting the plurality of outer diameter portion cores to the inner diameter portion core; and a plurality of arc type permanent magnets, each of the plurality of arc type permanent magnets being inserted between two adjacent outer diameter portion cores of the plurality of outer diameter portion cores, wherein each of the plurality of bridges includes a first straight portion extending in a radial direction of the rotor core, wherein a first angle θ1 defined between a first extension line and a second extension line satisfies Equation (1):

$$θ1 = 5.75° \pm 4°, \tag{1}$$

wherein the first extension line connects a center of each of the plurality of arc type permanent magnets with a center of the inner diameter portion core, and wherein the second extension line connects a center of the first straight portion in a width direction with the center of the inner diameter portion core, wherein each of the plurality of arc type permanent magnets includes:

a concave inner diameter portion having a first curvature, and a convex outer diameter portion having a second curvature, wherein the convex outer diameter portion is positioned in a counterclockwise direction or a clockwise direction, wherein, based on the convex outer diameter portion being positioned in the counterclockwise direction, the first extension line connects (i) the center of a first arc type permanent magnet among the plurality of arc type permanent magnets, the first arc type permanent magnet being disposed adjacent to a corresponding bridge of the plurality of bridges in the clockwise direction, with (ii) the center of the inner diameter portion core, wherein, based on the convex outer diameter portion being positioned in the clockwise direction, the first extension line connects (i) the center of a first arc type permanent magnet of the plurality of arc type permanent magnets that is disposed adjacent to a corresponding bridge of the plurality of bridges in the counterclockwise direction with (ii) the center of the inner diameter portion core, and wherein the first arc type permanent magnet satisfies E(5):

$$D = k4 \times C(k4 \text{ is } 0.62 \text{ to } 0.98), \tag{5}$$

where C is the first curvature of the concave inner diameter portion and D is the second curvature of the convex outer diameter portion.

14. The flux concentrate type rotor of claim 13, wherein the rotor core includes a plurality of core sheets.

15. The flux concentrate type rotor of claim 13, wherein the first arc type permanent magnet further includes a connecting portion connecting an end portion of the concave inner diameter portion to an end portion of the convex outer diameter portion, and wherein the connecting portion includes a second straight portion connected to the end portion of the convex outer diameter portion and a third straight portion, the third straight portion connecting an end portion of the second straight portion with the end portion of the concave inner diameter portion.

16. The flux concentrate type rotor of claim 15, wherein the first arc type permanent magnet satisfies Equation (4):

$$B = k3 \times E(k3 \text{ is } 1.8 \text{ to } 2.7), \tag{4}$$

where B is a width of the first arc type permanent magnet, and E is a magnetization center point gap.

17. The flux concentrate type rotor of claim 15, wherein the first arc type permanent magnet satisfies Equation (6):

$$M = (C/D) \times A/(C - D)(M \text{ is greater than or equal to } 2.5), \tag{6}$$

where A is a thickness of the first arc type permanent magnet, C is the first curvature of the concave inner diameter portion, and D is the second curvature of the convex outer diameter portion.

18. The flux concentrate type rotor of claim 13, wherein an outer diameter portion core includes a gap located adjacent to a bridge, and the gap and the first straight portion are arranged misaligned.

* * * * *